US007454173B2

United States Patent
Wiberg et al.

(10) Patent No.: US 7,454,173 B2
(45) Date of Patent: Nov. 18, 2008

(54) LOAD CONTROL IN SHARED MEDIUM MANY-TO-ONE COMMUNICATION SYSTEMS

(75) Inventors: Niclas Wiberg, Linköping (SE); Eva Englund, Linköping (SE); Ke Wang Helmersson, Linköping (SE); Janne Peisa, Espoo (FI); Johan Torsner, Masaby (FI); Christer Edholm, Stockholm (SE); Stefan Parkvall, Stockholm (SE); Maria Edvardsson, Järfälla (SE); Maria Samuelsson, Sundbyberg (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 746 days.

(21) Appl. No.: 10/830,663

(22) Filed: Apr. 23, 2004

(65) Prior Publication Data

US 2005/0239413 A1    Oct. 27, 2005

(51) Int. Cl.
    *H04B 1/00*    (2006.01)
(52) U.S. Cl. ..................... 455/69; 455/522; 455/450; 455/453; 455/574
(58) Field of Classification Search ............. 455/453, 455/512, 513, 522, 453.69, 574, 450
    See application file for complete search history.

(56) References Cited

U.S. PATENT DOCUMENTS

| 6,078,568 | A |   | 6/2000  | Wright    |         |
|-----------|---|---|---------|-----------|---------|
| 6,101,179 | A | * | 8/2000  | Soliman   | 370/342 |
| 6,983,153 | B2| * | 1/2006  | Jain et al.| 455/453|
| 2003/0003921 | A1 | * | 1/2003 | Laakso   | 455/453 |
| 2004/0203807 | A1 | * | 10/2004| Bl et al.| 455/450 |
| 2004/0242256 | A1 | * | 12/2004| Xiao et al.| 455/522 |

FOREIGN PATENT DOCUMENTS

| EP | 1033849 A1 | 9/2000 |
| WO | WO 01/24418 | * 5/2001 |

* cited by examiner

*Primary Examiner*—Charles N Appiah
*Assistant Examiner*—Olumide T Ajibade Akonai
(74) *Attorney, Agent, or Firm*—Roger S. Burleigh

(57) ABSTRACT

A load control method is described herein that enables a base station to broadcast three downlink signals including a busy indicator, a maximum resource indicator and a minimum resource indicator to a mobile terminal. In response to receiving the downlink signals, the mobile terminal limits the utilization of a resource (e.g., bit rate, transmission power, power offset) it uses to transmit data to the base station. The mobile terminal may also send an uplink signal including a resource request to the base station. The base station can use the resource request to change the downlink signals if needed. It is with the proper use of these uplink/downlink signals that the behavior of the base station can be automatically optimized to the load situation.

7 Claims, 5 Drawing Sheets

LOAD CONTROL IN SHARED MEDIUM MANY-TO-ONE COMMUNICATION SYSTEMS

BACKGROUND OF THE INVENTION

1. Field of the Invention

The present invention relates in general to a wideband code-division multiple-access (WCDMA) communication system and, in particular, to a method for limiting the utilization of a resource (e.g., bit rate, allowed power, power offset) used by a mobile terminal to transmit data to a base station in order to optimize and control the load at the base station.

2. Description of Related Art

In a WCDMA communication system it is often necessary that a base station apply some kind of load control so as to limit the amount of data that can be transmitted at any given time from mobile terminals. The base station needs to control this load because if it does not then the WCDMA uplink will suffer from high interference and reduce coverage if too many mobile terminals transmit at too high data rates simultaneously. The present invention addresses this concern by introducing a load control technique that can be implemented by the base station and mobile terminals in order to optimize and control the load at the base station.

BRIEF DESCRIPTION OF THE INVENTION

The present invention includes a load control method that enables a base station to broadcast three downlink signals including a busy indicator, a maximum resource indicator and a minimum resource indicator to a mobile terminal. In response to receiving the downlink signals, the mobile terminal limits the utilization of a resource (e.g., bit rate, transmission power, power offset) it uses to transmit data to the base station. The mobile terminal may also send an uplink signal including a resource request to the base station. The base station can use the resource request to change the downlink signals if needed. It is with the proper use of these downlink/uplink signals that the behavior of the base station is automatically optimized to the load situation. For instance, in low load conditions, the base station can utilize the load control method so that it can operate in a manner similar to a carrier-sense multiple-access (CSMA) principle and provide high data rates and short delays. And, in high load conditions, the base station can utilize the load control method so it can use parallel transmissions in a manner similar to a code-division multiple-access (CDMA) principle or a time scheduled principal and provide high capacity and stability.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
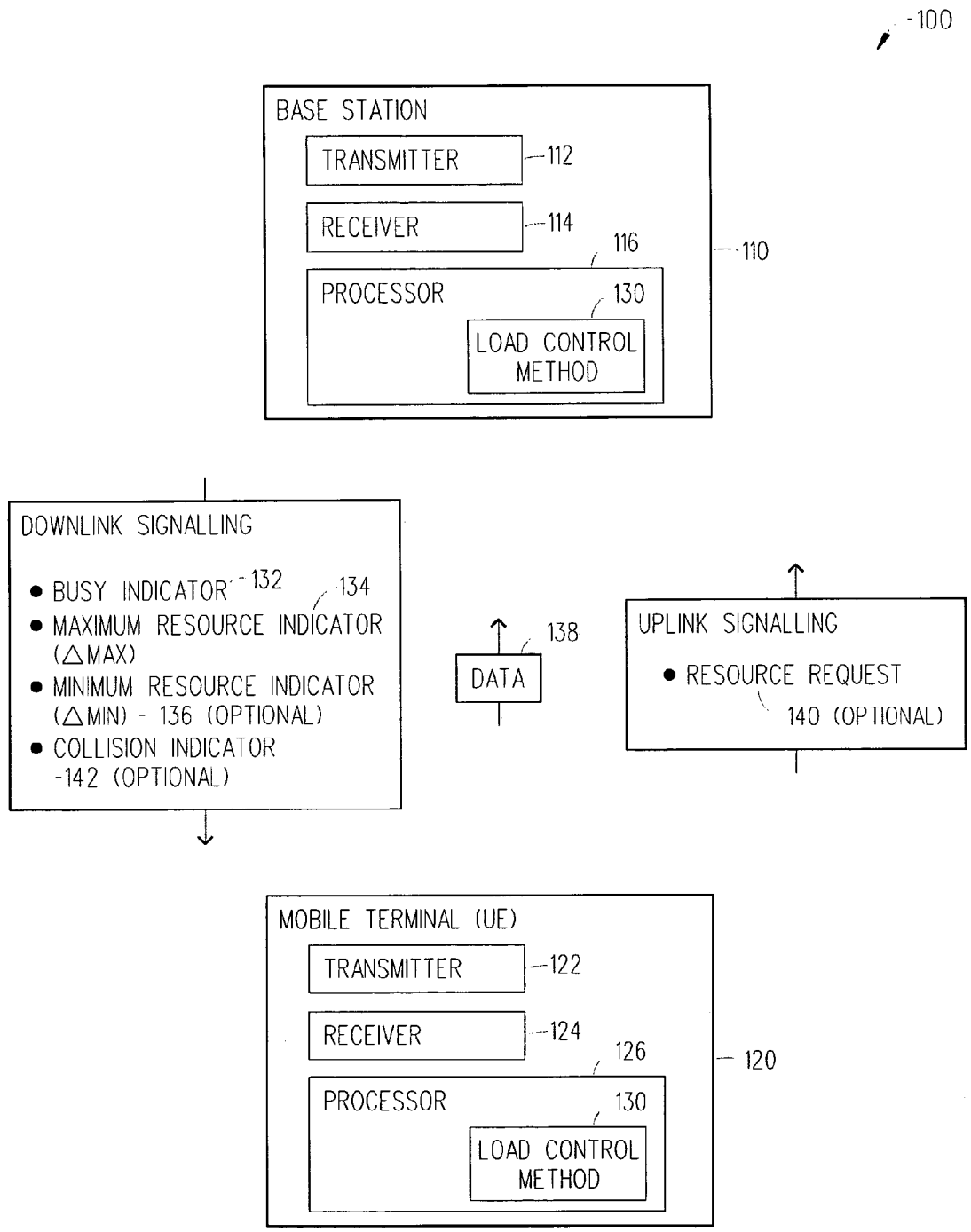
FIG. 1 is a block diagram of a WCDMA communications network which includes a base station and a mobile terminal both of which implement a load control method in accordance with the present invention.

Referring to FIG. 1, there is illustrated a block diagram of a WCDMA communications network 100 which includes a base station 110 (only one shown) and a mobile terminal 120 (only one shown) both of which implement a load control method 130 in accordance with the present invention. As shown, the base station 110 includes a transmitter 112, a receiver 114 and a processor 116. And, the mobile terminal 120 includes a transmitter 122, a receiver 124 and a processor 126. It should be noted that many components and details associated with the base station 110 and the mobile terminal 120 described herein are well known in the industry. Therefore, for clarity, the description provided herein omits those well known components and details that are not necessary to understand the present invention.

Basically, the load control method 130 limits the utilization of a resource of the mobile terminal 120 in order to optimize the load situation (shared resource) at the base station 110. To accomplish this, the load control method 130 enables the base station 110 (transmitter 112) to broadcast downlink signals including a busy indicator 132, a maximum resource indicator 134 and a minimum resource indicator 136 (optional) to the mobile terminal 120 (receiver 124). Then in response to receiving the downlink signals 132, 134 and 136, the mobile terminal 120 (processor 126) limits the utilization of a resource (e.g., bit rate, allowed power, power offset) it uses to subsequently transmit data 138 to the base station 110 (receiver 114). The mobile terminal 120 (transmitter 122) may also send an uplink signal that includes a resource request 140 to the base station 110 (receiver 114). The base station 110 (processor 116) uses the resource request 140 to help it to modify (if needed) the settings or values in the downlink signals 132, 134 and 136. As described in the examples provided below, it is with the proper use of these new signals 132, 134, 136 and 140 that the behavior of the base station 110 can be automatically optimized to the load situation.

Prior to discussing several different examples on how one can implement the load control method 130, a brief description is provided to describe in more detail what the shared resource is at the base station 110 and how this shared resource relates to the different types of resources that can be limited by the mobile terminal 120 in accordance with the load control method 130. Essentially, the shared resource at the base station 110 is, in any system with a non-orthogonal uplink, the received power. And, the received power at the base station 110 is proportional to the combined transmitted powers of all the mobile terminals 120 being serviced by that base station 110. Since the transmission power of a mobile terminal 120 is related to the bit rate of the transmitted data 138 it follows that the higher the bit rate, the higher the transmission power. As such, the mobile terminal 110 can limit the following two resources—bit rate and transmission power—and affect the shared resource at the base station 110. In addition, in the WCDMA communication system 100 there is a data channel and a low-rate control channel (e.g., dedicated physical control channel (DPCCH)) that is continuously transmitted in the uplink. This leads to another possible resource that the mobile terminal 120 can limit which is described herein as the power offset. The power offset is the relation between the power that is distributed between the data channel and the control channel. Hence, the utilization of the shared resource at the base station 110 can be controlled in accordance with the present invention by having the mobile terminal 120 limit the bit rate, the transmission power, or the power offset between the control signal and the data channel.

Figure 2:
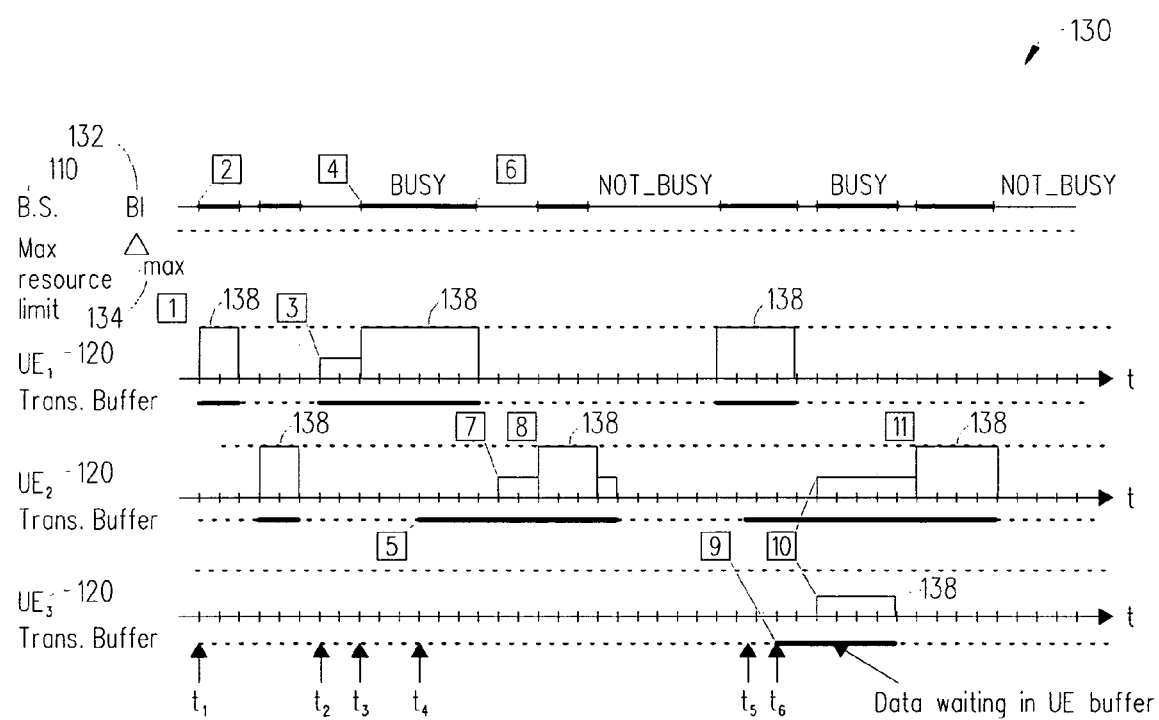
FIG. 2 is a diagram illustrating how a first embodiment of the load control method that uses a busy indicator, a maximum resource indicator and an autonomous ramping procedure can be implemented by the base station and mobile terminal in accordance with the present invention.

Referring to FIG. 2, there is a diagram illustrating how a first embodiment of the load control method 130 that uses the busy indicator 132, the maximum resource indicator 134 and an autonomous ramping procedure can be implemented by a base station 110 and mobile terminal 120. In this example, the busy indicator 132 and maximum resource indicator 134 are constantly broadcast from the base station 110. And, each mobile terminal 120 (only three shown as $UE_{1, 2 \text{ and } 3}$) is required to receive the downlink signals 132 and 134 and act according to the rules outlined below.

Generally, the mobile terminals 120 can initiate the transmission of data 138 and select the bit rates/powers/power offsets autonomously, within the limit given by the maximum resource indicator 134.

And, when the busy indicator 132 is set to "BUSY", then no mobile terminal 120 is allowed to begin transmission of the data 138 or to increase its bit rate/power/power offset. The mobile terminals 120 that are already transmitting data 138 are allowed to continue on the same bit rate/power/power offset, though, still obeying the limitation in the maximum resource indicator 134.

And, when the busy indicator 132 is cleared or set to "NOT BUSY", then the mobile terminals 120 are allowed to begin transmission of the data 138. However, if a mobile terminal 120 has been waiting for the busy indicator 132 to clear it may not begin transmission of the data 138 at full bit rate/power/power offset immediately, but instead must ramp-up the bit rate/power/power offset. The ramping procedure could be either fixed (e.g. specified by a standard) or could be configurable at channel setup. The ramping procedure is also applied to the mobile terminals 120 that were transmitting data 138 while the busy indicator 132 was set to "BUSY" but wanted to increase its bit rate/power/power offset. In addition, the mobile terminals 120 that are in the ramping phase still need to obey the busy indicator 132 if it is indicating that no further increase in the bit rate/power/power offset is allowed.

The rules associated with this embodiment of the load control method 130 can also be represented in another form that is described below:

The $UE_k$ 120 (mobile terminal$_k$ 120) interprets the BI fields 132 as follows:
if BI=BUSY then:
   $UE_k$ that is not transmitting data 138 is not allowed to begin transmitting data 138; or
   $UE_k$ that is already transmitting data 138 is allowed to continue transmission of the data 138 at its current (or lower) bit rate/power/power offset though still obeying a limitation in the maximum resource indicator 134; otherwise
if BI=NOT BUSY then:
   $UE_k$ is allowed to begin transmission of data 138 but in case $UE_k$ has been waiting for the BI 132 to be set to "NOT BUSY" it needs to follow a ramping procedure to ramp-up a bit rate/power/power offset of the transmitted data 138; or
   $UE_k$ if it was transmitting data 138 and wanted to increase a bit rate/power/power offset of the transmitted data 138 while the BI was set to BUSY it can now in accordance with the ramping procedure increase the bit rate/power/power offset of the transmitted data 138.

An example of this type of operation is illustrated in FIG. 2. At time t1 the user of $UE_1$ 120 initiates a transmission of data 138 and may immediately use the maximum bit rate/power/power offset since the busy indicator 132 is set to "NOT BUSY" (see box 1). The base station 110 then detects an increased load in the cell and sets the busy indicator 132 to "BUSY" (see box 2). The base station 110 can make this decision based on some measured value that exceeds a certain threshold. The base station 110 continues to transmit "BUSY" until the cell load has decreased. At time t2, the user of $UE_1$ 120 may again transmit data 138 at the maximum bit rate/power/power offset, but does not need to use the entire resource initially (see box 3). The base station 110 detects an increase in load, but does not set the busy indicator 132 to "BUSY" until the load reaches the desired threshold, at time t3 (see box 4). At time t4, $UE_2$ 120 receives data to transmit but may not transmit as the busy indicator 132 is set to "BUSY" (see box 5). Then after time t4, the base station 110 detects that the cell load has decreased and it sets the busy indicator 132 to "NOT BUSY" (see box 6). At this point, $UE_2$ 120 may start to transmit data 138 but as it has been waiting for the busy indicator 132 to clear it must ramp-up the bit rate/power/power offset (see box 7). In this case $UE_2$ 120 can ramp-up the bit rate/power/power offset to the maximum allowed since it is the only mobile terminal 120 that has been waiting for transmission (see box 8). Another situation is illustrated at time t5 and t6 where both $UE_2$ 120 and $UE_3$ 120 obtain data while the busy indicator 132 is set to "BUSY" (see box 9). After the base station 110 sets the busy indicator 132 to "NOT BUSY" then both $UE_2$ 120 and $UE_3$ 120 can start transmitting data 138 (see box 10). As can be seen, both $UE_2$ 120 and $UE_3$ 120 obey the bit rate/power/power offset ramping procedure as they have been waiting to transmit data 138. When the cell load again reaches the desired limit, the base station 110 sets the busy indicator 132 to "BUSY" and the $UE_2$ 120 and $UE_3$ 120 freeze their bit rate/power/power offset until the busy indicator 132 is set back to "NOT BUSY" (see box 11).

Although not shown in FIG. 2, the mobile terminals 120 can transmit a resource request 140 to the base station 110 to inform the base station 110 as to whether or not it needs to transmit data 138. If the request signal 140 is used in combination with the busy indicator 132, then the resource request 140 needs only to be signaled to the base station 110 when the busy indicator 132 is set to "BUSY". The base station 110 can use the resource request 140 to set the value in the busy indicator 132 in a manner that saves unnecessary delay in low load situations. The base station 110 can also use the resource request 140 to decide whether or not the value in the maximum resource indicator 134 should be adjusted to let more mobile terminals 120 transmit or to let the active mobile terminals 120 use a higher bit rate/power/power offset if fewer mobile terminals 120 are active.

The base station 110 sets the values in the indicators 132, 134 and 136 based on the activity on the shared media. Typically, the base station 110 determines the status of the busy indicator 132 in view of instantaneous activity, while the status of the maximum resource indicator 134 depends more on the long-term activity. For instance, the base station 110 can set the busy indicator 132 to "BUSY" whenever the current transmission load is so high that it would not be possible to have anymore mobile terminals 120 active without compromising the quality of the ongoing transmissions. This could be determined either by monitoring the total data rate of the ongoing transmissions, or by measuring some signal property such as the received signal strength or interference level. In contrast, the base station 110 could change the busy indicator 132 to "NOT BUSY" when the load decreases to a level where it would be possible to have more active mobile terminals 120. After setting the busy indicator 132 to "NOT BUSY", the base station 110 may detect that several mobile terminals 120 are simultaneously ramping up the transmission bit rate/power/power offset. If this happens and the base station 110 detects that the current transmission load is too high, it should again set the busy indicator 132 to "BUSY".

In addition to controlling the busy indicator 132, the base station 110 should monitor its average activity. If the busy indicator 132 is set to "BUSY" often during a time period, or if it is constantly set to "BUSY" for an extended time, it means that the mobile terminals 120 often have to wait before initiating transmission. It also means that the ramping procedure is often applied. To avoid this, the base station 110 could decrease the maximum bit rate/power/power offset in the maximum resource indicator 134. By doing so, the base station 110 should be able to have more mobile terminals 120 transmitting in parallel, thus reducing the use of the "BUSY" busy indicator 132. Conversely, if the busy indicator 132 is rarely set to "BUSY" during a time period, it means that the radio resources of the base station 110 are under-utilized. In this situation, the base station 110 may increase the allowed bit rate/power/power offset in the maximum resource indicator 134.

Although the busy indicator 132 can be used to prevent a mobile terminal 120 from initiating transmission of data 138 when there are no resources available, it does not prevent the mobile terminals 120 from transmitting data 138 at exactly the same time which means that collisions may occur because too many mobile terminals 120 transmit or transmit with too high of a data rate. In certain scenarios, especially if the busy indicator 132 is used in a base station 110 that has a fixed timing relation between retransmissions, this may lead to a large number of consecutive collisions. To address this problem a third indicator may be introduced, the collision indicator 142 (see FIG. 1). The base station 110 can set and broadcast the collision indicator 142 to indicate the possibility of collisions occurring to the mobile terminals 120 that have recently initiated simultaneous transmission (or increased their data rates). These mobile terminals 120 can then resolve the situation by adjusting their retransmission delay, reducing their rates/power offsets or stopping transmission (for example).

Figure 3A:
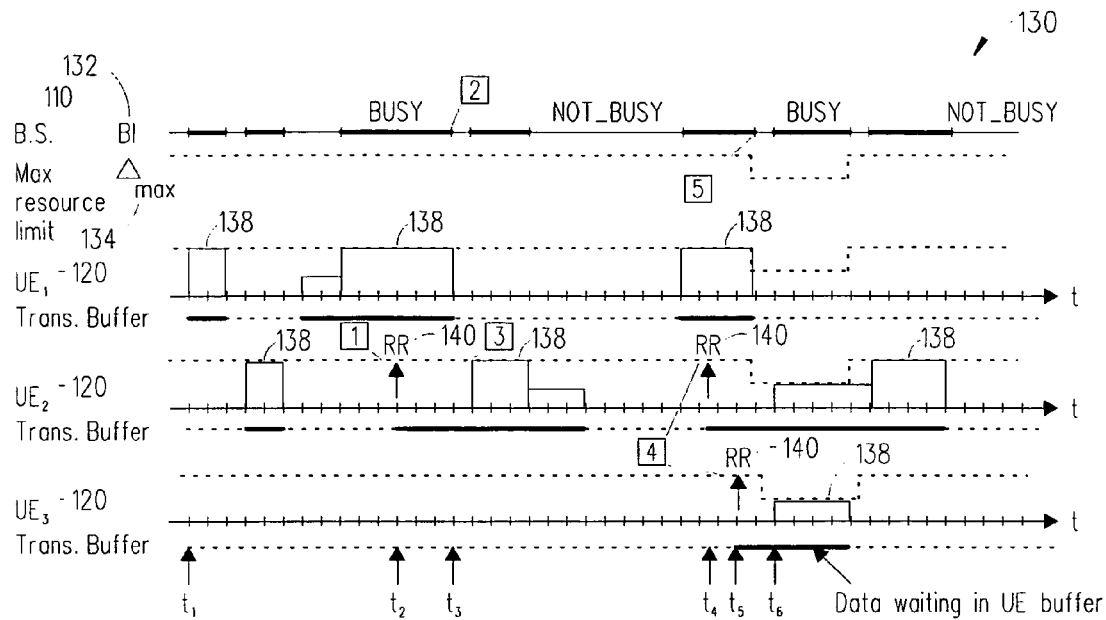
FIGS. 3A and 3B are two diagrams illustrating different ways how a second embodiment of the load control method that uses a busy indicator, a maximum resource indicator and a minimum resource indicator can be implemented by the base station and mobile terminal in accordance with the present invention.
Figure 3B:
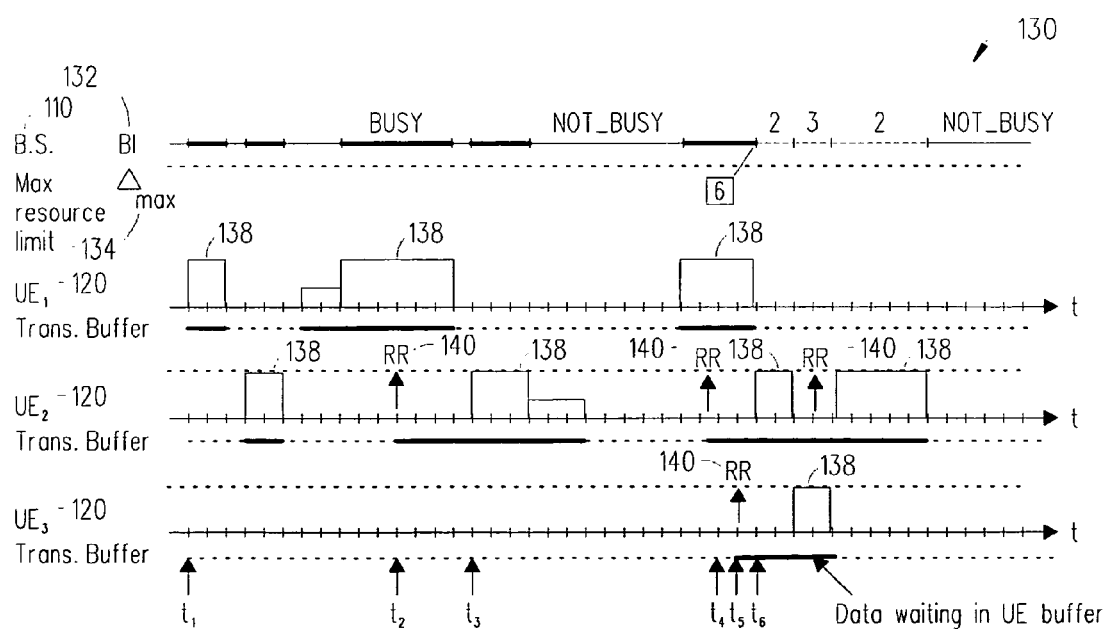

Referring to FIGS. 3A and 3B, there is a diagram illustrating how a second embodiment of the load control method 125 that uses the busy indicator 132, the maximum resource indicator 134, the minimum resource indicator 136, the resource request 140 can be implemented by the base station 110 and mobile terminal 120. In this example, the downlink signals 132, 134 and 136 are constantly broadcast on a scheduling channel from the base station 110. However as an alternative, the minimum resource indicator 136 instead of being broadcasted it can be indicated to each mobile terminal 120 via higher layer signaling for example when establishing the channel or it can be derived from the configured Transport Format Combination Set (preconfigured data rates) based on a predefined rule. In addition, the minimum resource indicator 136 can be derived from some other quantities signaled by higher level signaling. Also as will be seen in this example, the busy indicator 132 can take on the values "BUSY", "NOT BUSY" or a user identification, 1, 2, 3 . . . , K, where K is the number of mobile terminals 120 participating in the scheduling process. Furthermore in this example, the mobile terminals 120 may transmit a resource request 140 in the uplink indicating to the base station 110 whether or not there is a need to transmit data 138 or alternatively if there is a need to increase the transmission bit rate/power/power offset. The resource request 140 may also contain information on the power situation and/or transmit buffer status in the mobile terminal 120. Accordingly in this embodiment, each mobile terminal 120 (only three shown as $UE_{1, 2 \text{ and } 3}$) is required to receive the downlink signals 132, 134 136 and act according to the rules described below.

Generally, the mobile terminals 120 initiate transmission of data 138 and select the bit rate/power/power offset autonomously, within the limits given by the maximum and minimum resource indicators 134 and 136. A mobile terminal 120 may always transmit data 138 with a bit rate/power/power offset that does not exceed the minimum bit rate/power/power offset but may never transmit data 138 with a bit rate/power/power offset that exceeds the maximum resource limit.

And, when the busy indicator 132 is set to "NOT BUSY" then any mobile terminal 120 is allowed to immediately transmit data 138 with a bit rate/power/power offset not exceeding the maximum, without sending a resource request 140 in advance.

And, when the busy indicator 132 is set to "BUSY" then no mobile terminal 120 that is transmitting data 138 with a bit rate/power/power offset above the minimum is allowed to increase its bit rate/power/power offset. The mobile terminals 120 that are already transmitting data 138 are allowed to continue transmitting with the same bit rate/power/power offset but must still obey the maximum limit. This means that if the maximum limit is decreased to a bit rate/power/power offset that is smaller than what the mobile terminal 120 is using then that mobile terminal 120 must decrease the bit rate/power/power offset to the lower level. Finally, the mobile terminals 120 that are initiating transmissions must not use a bit rate/power/power offset exceeding the minimum limit.

And, when the busy indicator 132 takes on a user identification value, 1, 2, . . . K, the cell is operated in a scheduled mode. In this situation, only the mobile terminal 120 that is identified by the busy indicator 132 or had been previously identified by the busy indicator 132 within a certain time span $T_{sch}$ is allowed to transmit data 138 with a bit rate/power/power offset that is greater than the minimum limit. The time span $T_{sch}$ can be signaled and defined to the mobile terminal 120 using higher level signaling e.g., when establishing the channel, it can be predefined, or it can be transmitted to the mobile terminal 120 in the same way as the resource indicator 136. Multiple terminals 120 can be scheduled simultaneously if multiple identification values can be transmitted simultaneously, e.g., by transmitting on several scheduling channels.

The rules associated with this embodiment of the load control method 130 can also be represented in another form that is described below:

$UE_k$ 120 (mobile terminal$_k$ 120) interprets the BI fields 132 as follows:
  if BI="BUSY" then
    if $UE_k$ 120 was already transmitting data 138 with bit rate/power/power offset Δ then
      transmit with any bit rate/power/power offset Δ≦min(Δmax, Δ)
    else
      transmit at any bit rate/power/power offset Δ≦Δmin.

if BI="NOT BUSY" then
    the $UE_k$ 120 may transmit with any bit rate/power/ power offset $\Delta \leq \Delta max$
if BI=k then
    the $UE_k$ 120 that is scheduled or had been previously identified by the BI within a certain time span $T_{sch}$ may transmit at any bit rate/power/power offset $\Delta \leq \Delta max$
otherwise (i.e., ID∉{BUSY, NOT_BUSY, k})
    the $UE_k$ 120 that is not scheduled may transmit at any rate/power offset $\Delta \leq \Delta min$.

The $\Delta max$ above refers to the maximum resource limit and the $\Delta min$ to the minimum resource limit. As described above, the downlink signalling may be combined with the uplink resource request 140 that is sent from the mobile terminal 120 to the base station 110. The resource request 140 could for example contain a single bit that is set to one if the mobile terminal 120 has some data 138 to transmit or it could be set to one if the mobile terminal 120 detects a need to increase its bit rate/power/power offset. The resource request 140 may also take the power availability into account. Some additional examples of possible configurations of the resource request 140 are provided below:

Example I
    0 if the minimum resource limit is sufficient.
    1 if the minimum resource limit is not sufficient.
Example II
    0 if the current resource limit is sufficient.
    1 if the current resource limit is not sufficient.
Example III
    0 if there is data to transmit.
    1 if there is no data to transmit.
Example IV
    Three levels
        DTX—if there is no data to transmit.
        0—if there is data to transmit & the mobile terminal 120 is not capable of using more resources (limited by the available transmit power).
        1—if there is data to transmit & the mobile terminal 120 is capable of using more resources (is not limited by the available transmit power).

If more bits are available then these different alternatives can also be combined. As described above, the base station 110 can use the resource request 140 to set the limit in the maximum resource indicator 132 to an appropriate value depending on the current load it may also be used to schedule mobile terminals 120.

Two examples of how the rules of the second embodiment of the load control method 130 can be implemented are illustrated in FIGS. 3A and 3B. In FIG. 3A, the resource request 140 is used in combination with the busy indicator 132. To simplify this example the minimum resource indicator 136 was chosen to be zero. Also, initially the maximum resource indicator 134 was chosen to accommodate a single mobile terminal 120. As can be seen, when data arrives at the transmit buffer of $UE_2$ 120 at time t2 the mobile sets the resource request 140 to one, indicating to the base station 110 that it is waiting for permission to transmit (see box 1). The base station 110 monitors the resource requests 140. At time t3, the base station 110 sets the busy indicator 132 to "NOT BUSY" when it knows that $UE_2$ 120 is the only mobile terminal 120 that is waiting for transmission and does not need to decrease the maximum bit rate/power/power offset (see box 2). After t3, the $UE_2$ 120 may start transmission at maximum bit rate/power/power offset without ramping the bit rate/power/power offset after it learns that the busy indicator 132 was set to "NOT BUSY" (see box 3). However, for the case when several resource requests 140 are detected, as in time t4 and t5, the base station 110 knows that $UE_2$ 120 and $UE_3$ 120 are waiting for transmission (see box 4). Then at t6, the base station 110 sets the busy indicator 132 to "NOT BUSY" and lowers the bit rate/power/power offset in the maximum resource indicator 134 in order to accommodate $UE_2$ 120 and $UE_3$ 120 simultaneously (see box 5). In FIG. 3B another possibility is illustrated at this point that can be used to enable the base station 110 to avoid conflicts. In this case, the base station 110 uses the busy indicator 132 starting at time t6 to schedule $UE_2$ 120 first and then schedule $UE_3$ 120 instead of decreasing the limit in the maximum resource indicator (see box 6). The base station 110 may make this scheduling decision based on the radio propagation conditions of $UE_2$ 120 and $UE_3$ 120 in combination with the resource request 140. For simplicity the scheduling span $T_{sch}$ in this example was chosen to be one Transmission Time Interval (TTI).

Figure 4A:
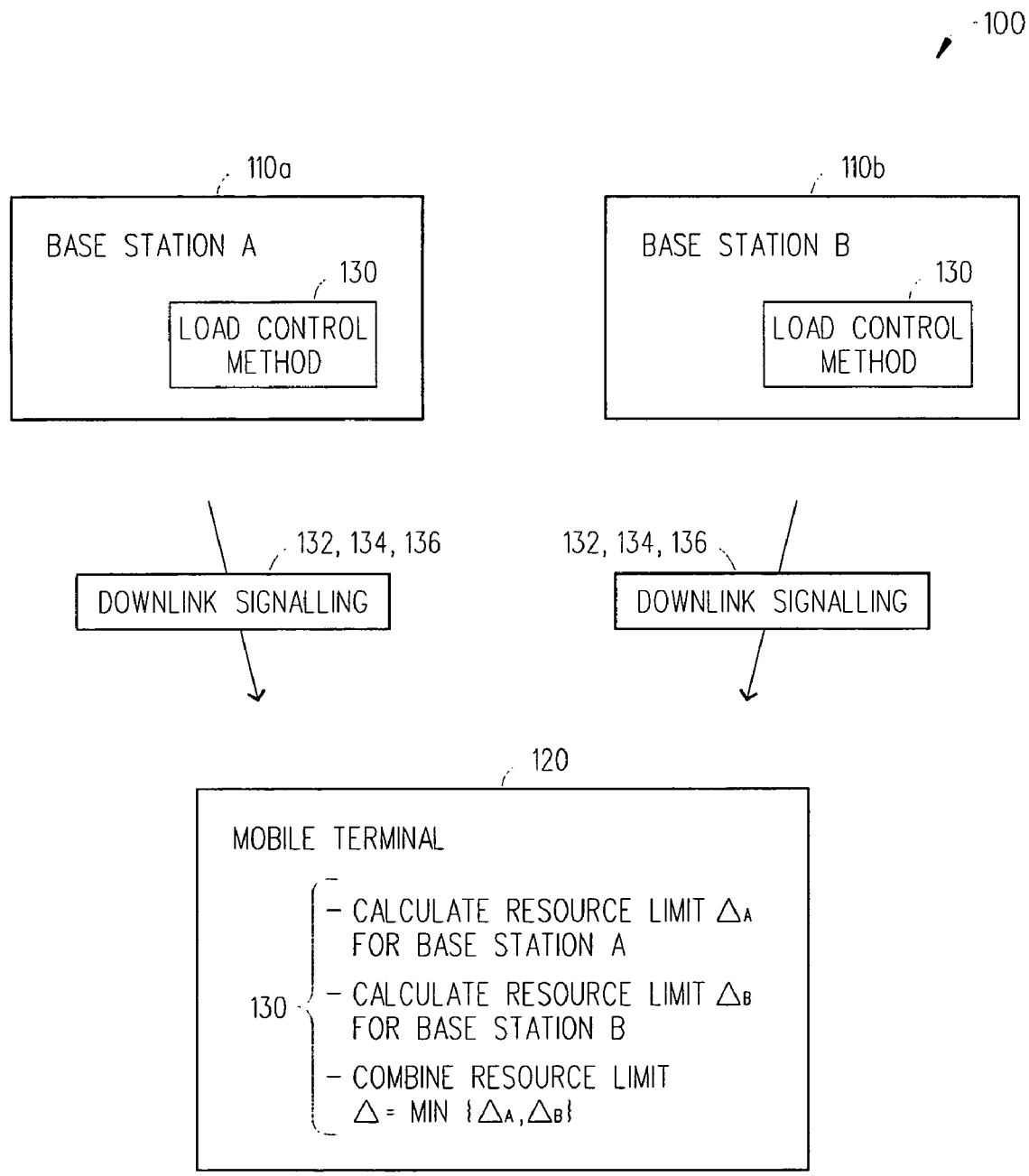
FIGS. 4A and 4B are two diagrams illustrating different ways that the load control method can be implemented when the mobile terminal communicates with multiple base stations in accordance with the present invention.
Figure 4B:
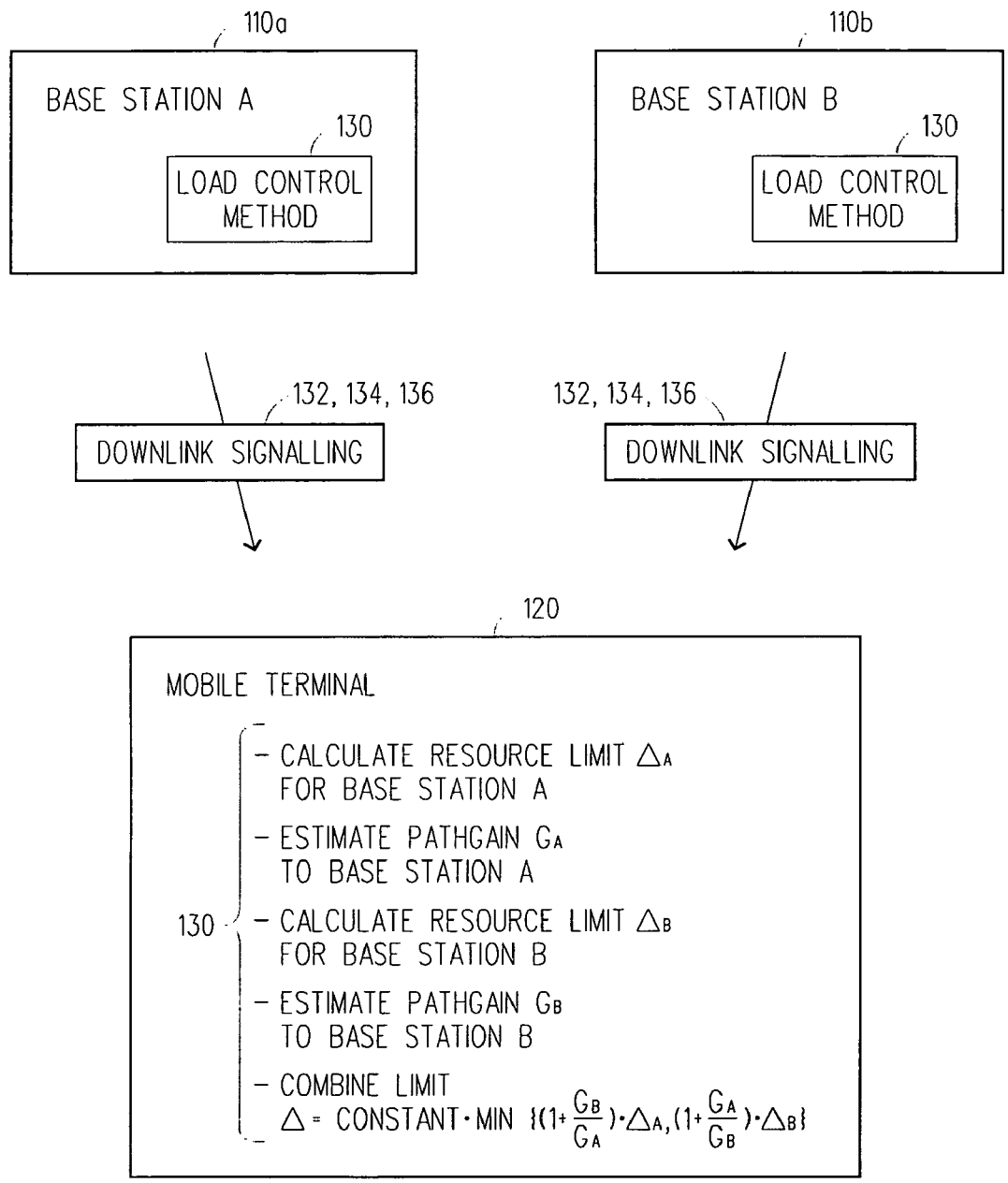

Referring to FIGS. 4A and 4B, there are two diagrams illustrating two different examples that the load control method 130 can be implemented when the mobile terminal 120 communicates with multiple base stations 110a and 110b (only two shown). In the wireless communication system 100, the mobile terminal 120 may communicate with several base stations 110a and 110b simultaneously. For example, in case of soft handover (SOHO) or when there is a risk that the operation of the mobile terminal 120 can cause severe interference to surrounding cells. As such, the mobile terminal 120 needs to monitor the busy and resource indicators 132, 134 and 136 from several base stations 110a and 110b. In these types of situations, the resource restriction rules from the various base stations 110a and 110b are combined and adhered to by the mobile terminal 120.

One example of how to combine the rules of the load control method 130 is illustrated in FIG. 4A. Based on the rules described above with respect to FIG. 2 and FIGS. 3A and 3B, the mobile terminal 120 can calculate the resource limit according to base station 110a, $\Delta_A$. Likewise, the mobile terminal 120 uses these rules to obtain a resource limit from base station 110b, $\Delta_B$. From the two resource limits $\Delta A$ and $\Delta B$, the mobile terminal 120 derives a combined resource limit, $\Delta$, by taking the minimum of the two limits, $\Delta = \min(\Delta_A, \Delta_B)$. The mobile terminal 120 may not transmit data 138 with a bit rate/power/power offset that exceeds the combined limit $\Delta$.

In another example shown in FIG. 4B, the mobile terminal 120 also estimates the radio propagation conditions to the base stations 110a and 110b. For instance, the mobile terminal 120 can estimate the pathgain. Or, in systems 100 where pilot signals are transmitted from base stations 110a and 110b then these pilot signals can be used for estimating how strong the received power is in relation to the transmitted power. Alternatively, in CDMA systems 100 where there are power control commands transmitted from the base stations 110a and 110b then the mobile terminal 120 can use these power control commands to estimate instantaneous variations in propagation. The mobile terminal 120 can then use anyone of these estimates to derive the combined resource limit $\Delta$. For instance as shown in FIG. 4B, the mobile terminal 120 estimates the pathgains to the two base stations, $G_A$ and $G_B$, and uses these estimates to weight the limits $\Delta_A$ and $\Delta_B$ to when calculating the combined resource limit $\Delta$. For example, if the pathgain to base station 110a is small in comparison to the pathgain to base station 110b then the limitation from base station 110a can be relaxed somewhat by weighing the resource limits $\Delta_A$ and $\Delta_B$. And, if the difference in gain between the two radio links is sufficiently large then the limit from the poorer link $\Delta A$ (for example) can be ignored and the mobile terminal 120 can follow the resource limit $\Delta B$ (for example) from the better link.

From the foregoing, it should also be readily appreciated that the load control method 130 can be used in any type of a shared-medium many-to-one transmission system 100 such as a WCDMA system 100 or a CDMA system 100 to adapt its behavior to the load. By doing so, the system 100 can provide high data rates and short delays in scenarios with low load, and also provide high capacity and stability in scenarios with high load. This is an advantage over traditional many-to-one transmission systems that either work well in a low load situation or in a high load situation.

Although several embodiments of the present invention have been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method for limiting the utilization of a resource used by a mobile terminal to transmit data to a base station in order to optimize and control a load at the base station, said method comprising the steps of:
   receiving a plurality of downlink signals at said mobile terminal that were transmitted from said base station;
   processing the downlink signals to establish a limitation on the use of a resource that is associated with data which is subsequently transmitted from said mobile terminal to said base station;
   wherein said resource is a bit rate, transmission power or a power offset where said power offset is a function of power that is distributed between a data channel and a control channel;
   wherein said downlink signals include:
      a busy indicator; and,
      a maximum resource indicator; and,
   wherein said step of processing the downlink signals to establish the limitation on the use of the resource that is associated with the data which is subsequently transmitted by said mobile terminal to said base station is performed in the following manner:
   if said busy indicator is set to busy then:
      said mobile terminal is not allowed to begin transmission of the data; or,
      said mobile terminal if it is already transmitting data is allowed to continue transmission of the data at its current or lower bit rate, power, or power offset though still obeying a limitation in the maximum resource indicator; otherwise,
   if said busy indicator is not set to busy then:
      said mobile terminal is allowed to begin transmission of the data but if said processor had been waiting to transmit data because the busy indicator was previously set to busy then said processor needs to follow a ramping procedure to ramp-up a bit rate, power, or power offset of the transmitted data; or,
      said mobile terminal if it was transmitting data and wanted to increase a bit rate, power, or power offset of the transmitted data while said busy indicator was set to busy can now in accordance with the ramping procedure increase the bit rate, power, or power offset of the transmitted data.

2. The method of claim 1, wherein said downlink signals further include a collision indicator which informs said mobile terminal about possible data collisions with other mobile terminals.

3. The method of claim 1, wherein a minimum resource indicator is sent to said mobile terminal using higher level signaling instead of being transmitted in the downlink signals to said mobile terminal.

4. The method of claim 1, wherein said mobile terminal generates an uplink signal which includes a resource request that is transmitted to said base station, where said resource request indicates one of the following:
   if a limitation of a minimum resource indicator is or is not sufficient;
   if a current resource limit is or is not sufficient;
   if there is or is not data to transmit; or
   if there is no data to transmit, if there is data to transmit but said mobile terminal cannot utilize more resources, or if there is data to transmit and said mobile terminal can utilize more resources.

5. The method of claim 1, wherein: said downlink signals or higher level signals include:
   a minimum resource indicator; and said step of processing the downlink signals to establish the limitation on the use of the resource that is associated with the data which is subsequently transmitted by said mobile terminal to said base station is performed in the following manner:
   if said busy indicator is set to busy then:
      said mobile terminal is allowed to begin transmission of the data but at a bit rate, power, or power offset that is less than a limitation in the minimum resource indicator; or
      said mobile terminal if it is already transmitting data is allowed to continue transmission of the data at its current bit rate, power, or power offset though still obeying a limitation in the maximum resource indicator; otherwise
   if said busy indicator is not set to busy then:
      said mobile terminal is allowed to begin transmission of the data but at a bit rate, power, or power offset that is less than a limitation in the maximum resource indicator; otherwise
   if said busy indicator has a user identification 1, 2, 3 ... K then:
      said mobile terminal that has an identification that is the same as the identification in said busy indicator or had been previously identified by said busy indicator within a certain time span $T_{sch}$ is allowed to begin transmission of the data but at a bit rate, power, or power offset that is less than a limitation in the maximum resource indicator; otherwise
      said mobile terminal that does not have an identification that is the same as any of the previous identifications in said busy indicator during a time span $T_{sch}$ is allowed to begin transmission of the data but at a bit rate, power, or power offset that is less than a limitation in the minimum resource indicator.

6. The method of claim 1, wherein said mobile terminal is capable of receiving multiple sets of downlink signals that were generated by and transmitted from multiple base stations and said mobile terminal is capable of processing the downlink signals and using a combined resource limit to establish the limitation on the use of the resource that is associated with the data which is subsequently transmitted by said mobile terminal to one of the base stations.

7. The method of claim 1, wherein said mobile terminal is capable of receiving multiple sets of downlink signals that were generated by and transmitted from multiple base stations and said mobile terminal is capable of processing the downlink signals and using a combined resource limit and estimated radio propagation conditions to establish the limitation on the use of the resource that is associated with the data which is subsequently transmitted by said mobile terminal to one of the base stations.

* * * * *

UNITED STATES PATENT AND TRADEMARK OFFICE
CERTIFICATE OF CORRECTION

| | | |
|---|---|---|
| PATENT NO. | : 7,454,173 B2 | Page 1 of 1 |
| APPLICATION NO. | : 10/830663 | |
| DATED | : November 18, 2008 | |
| INVENTOR(S) | : Wiberg et al. | |

It is certified that error appears in the above-identified patent and that said Letters Patent is hereby corrected as shown below:

In Column 10, Line 14, in Claim 5, delete "signals" and insert -- signaling --, therefor.

Signed and Sealed this

Thirty-first Day of March, 2009

JOHN DOLL
*Acting Director of the United States Patent and Trademark Office*